(12) United States Patent
Takano et al.

(10) Patent No.: US 7,967,593 B2
(45) Date of Patent: Jun. 28, 2011

(54) APPARATUS FOR SUPPLYING SYNTHETIC RESINS

(75) Inventors: Shoichiro Takano, Yokohama (JP); Satoru Nemoto, Yokohama (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 414 days.

(21) Appl. No.: 12/067,424

(22) PCT Filed: Sep. 14, 2006

(86) PCT No.: PCT/JP2006/318661
§ 371 (c)(1),
(2), (4) Date: Jul. 24, 2008

(87) PCT Pub. No.: WO2007/034845
PCT Pub. Date: Mar. 29, 2007

(65) Prior Publication Data
US 2009/0267272 A1    Oct. 29, 2009

(30) Foreign Application Priority Data

Sep. 21, 2005  (JP) ................................ 2005-274148

(51) Int. Cl.
*B29C 43/08* (2006.01)
*B29C 43/34* (2006.01)

(52) U.S. Cl. ........ 425/297; 425/310; 425/311; 425/313; 425/348 R; 425/809

(58) Field of Classification Search .................. 425/182, 425/184, 196, 522, 527–534, 540, 575–576, 425/316, 317, 306–307, 377, 297, 298, 311
See application file for complete search history.

(56) References Cited

U.S. PATENT DOCUMENTS

| | | | | |
|---|---|---|---|---|
| 3,596,315 A | * | 8/1971 | Yoshikawa et al. | 425/527 |
| 4,755,125 A | * | 7/1988 | Takeda et al. | 425/576 |
| 5,344,299 A | * | 9/1994 | Takeuchi | 425/142 |
| 5,922,407 A | * | 7/1999 | Hess et al. | 427/348 |

FOREIGN PATENT DOCUMENTS
JP    2000-108127 A    4/2000
JP    2004-276372 A    10/2004
* cited by examiner

*Primary Examiner* — Richard Crispino
*Assistant Examiner* — Thu Khanh T Nguyen
(74) *Attorney, Agent, or Firm* — Sughrue Mion, PLLC (57) ABSTRACT

An apparatus for supplying synthetic resins applicable to a metal mold wheel that rotates at a high speed. A cutter of a cutter unit and a holding fitting are attached to an air cylinder, so that the cutter unit can be advanced and retreated in the radial direction of rotation. When the molten resin is stably blown out from an extrusion nozzle, the air cylinder is expanded to move the cutter to an advanced position to cut the molten resin. When the molten resin is unstably blown out from the extruder, the air cylinder is contracted and the cutter is arranged at a retreated position so will not to come in contact with the molten resin. Despite the cutter wheel continues to rotate, the molten resin is not contacted by the cutters.

7 Claims, 10 Drawing Sheets

APPARATUS FOR SUPPLYING SYNTHETIC RESINS

TECHNICAL FIELD

The present invention relates to an apparatus for supplying synthetic resins which enables a cutter wheel at rest to be quickly brought to an operating state and to be favorably brought into agreement with the rotational speed of a metal mold wheel rotating at a high speed.

BACKGROUND ART

Plastic containers made of a polyethylene terephthalate or the like have been widely placed in practical use as containers for containing beverages. Preforms from which the plastic containers are obtained are, generally, formed by using an injection-forming machine. In recent years, however, attempts have been made to form the preforms by using a compression-forming machine, and a variety of improvements have been made therefor. In carrying out the compression forming, a molten resin extruded from an extrusion opening of an extrusion nozzle is supplied (conveyed) to the compression-forming machine in a manner as described below.

The synthetic resin heated and melted in the extruder is extruded from the extrusion opening of the extrusion nozzle of the extruder, is cut by a cutter of a cutter wheel that is rotating, and is separated away from the extrusion opening. The synthetic resin that is separated away is supplied to synthetic resin-holding means provided on the cutter wheel. The holding means holds the synthetic resin, and releases the holding state, permitting the synthetic resin that is held to fall down.

The compression-forming machine is so arranged that the mold (female mold) comes in contact with a rotary orbit of the holding means. The synthetic resin held by the holding means is moved to a position over the mold of the compression-forming machine, discharged downward (permitted to fall down) as the holding means is released, and is supplied into the mold. Here, the position of the holding means is brought into agreement with the position of the mold to supply the molten resin. In the compression-forming machine, the synthetic resin supplied to the female mold is compression-formed in cooperation with the male mold provided for the compression-forming machine to thereby form a preform of a desired shape. JP-A-2000-108127 discloses an apparatus that separates the synthetic resin in a molten state away from the extrusion opening of the extrusion nozzle and supplies it to the compression-forming machine. JP-A-62-3926 and JP-UM-B-6-27372 are disclosing devices for separating away a synthetic resin in a molten state in a hollow blow-forming machine and in a plastic granulating machine.

A metal mold wheel continues to rotate at a constant speed while a cutter wheel remains at rest at the start of the operation until the molten resin discharged from the extrusion opening of the extruder assumes a stable state. When a state is reached where the molten resin is discharged at a constant rate maintaining stability, a motive power source and a clutch are connected together causing the cutter wheel to instantaneously rotate at an outer circumferential speed in agreement with that of the metal mold wheel.

Problem does not arouse much when the metal mold wheel is rotating at a low speed. When the metal mold wheel is rotating at a high speed to meet the requirement of high-speed molding, however, the cutter wheel is brought into agreement with the rotational speed of the metal mold wheel requiring an extended period of time and causing an increased load. In order to instantaneously drive and rotate the cutter wheel, therefore, it becomes necessary to use the motor and the clutch having increased driving forces.

The present invention was accomplished in view of the above-mentioned circumstances, and has an object of providing an apparatus for cutting and supplying synthetic resins, which can meet the trend for revolving the metal mold wheel at a high speed, and can be applied to the metal mold wheel that rotate at a high speed yet using a motor and a clutch of small driving forces.

DISCLOSURE OF THE INVENTION

In order to achieve the above object, the present invention provides an apparatus for supplying synthetic resins including a cutter wheel which rotates cutter units each having:

a cutter for cutting a molten resin extruded from an extrusion nozzle of an extruder that uses a synthetic resin as a raw material; and holding means for holding the molten resin cut by the cutter at a position close to the cutter;

wherein there is provided a position or a section where a rotary orbit of a mold of a metal mold wheel for receiving the molten resin comes into agreement with a rotary orbit of the holding means as viewed on a plane, the cutter wheel and the metal mold wheel are rotated in a manner that the holding means is positioned over a port of the mold for receiving the molten resin at the above position or in the above section, and the molten resin held in the holding means is released therefrom so as to be supplied into the mold;

characterized in that the cutter units are allowed to be expanded and contracted in the radial direction of rotation thereof, the cutter units are moved forward which is outward in the radial direction of rotation thereof when the molten resin is stably discharged from the extruder to cut the molten resin by the cutters and, when the molten resin is unstably discharged from the extruder, the cutter wheel continues to rotate while retreating the cutter units to the positions on the inner side in the radial direction of rotation thereof so as not to come in contact with the molten resin.

According to the present invention, the cutter wheel is provided with the cutter units in a plural number, at least one cutter unit among the plurality of cutter units is arranged at a retreated position, and the molten resin is cut by the cutters of the remaining cutter units at the advanced positions. The cutter units at the retreated positions may be every other cutter unit, every plural cutter units, or those selected at random.

According to the present invention, the cutter units are attached to the expansion cylinders and are advanced or retreated by the expansion cylinders. The advancing and retreating motions of the expansion cylinders are changed over by arranging a pair of opposing cams so as to be moved by a second cylinder at stationary portions of the apparatus for supplying the synthetic resins, passing, between the cams, a mechanical valve that is rotated by the cutter wheel as the expansion cylinder is, and by causing the mechanical valve to be pushed by the cams when the distance between the cams is narrowed by the action of the second cylinder.

According to the present invention, a blow nozzle for ejecting a gas is provided near the extrusion nozzle, a tray (chute) for recovering the molten resin is provided in a direction in which the gas is injected from the blow nozzle, and the unused molten resin cut by the cutters is recovered by the recovery tray.

BEST MODE FOR CARRYING OUT THE INVENTION

An embodiment of the apparatus for supplying synthetic resins of the invention will now be described with reference to the drawings.

Figure 1:
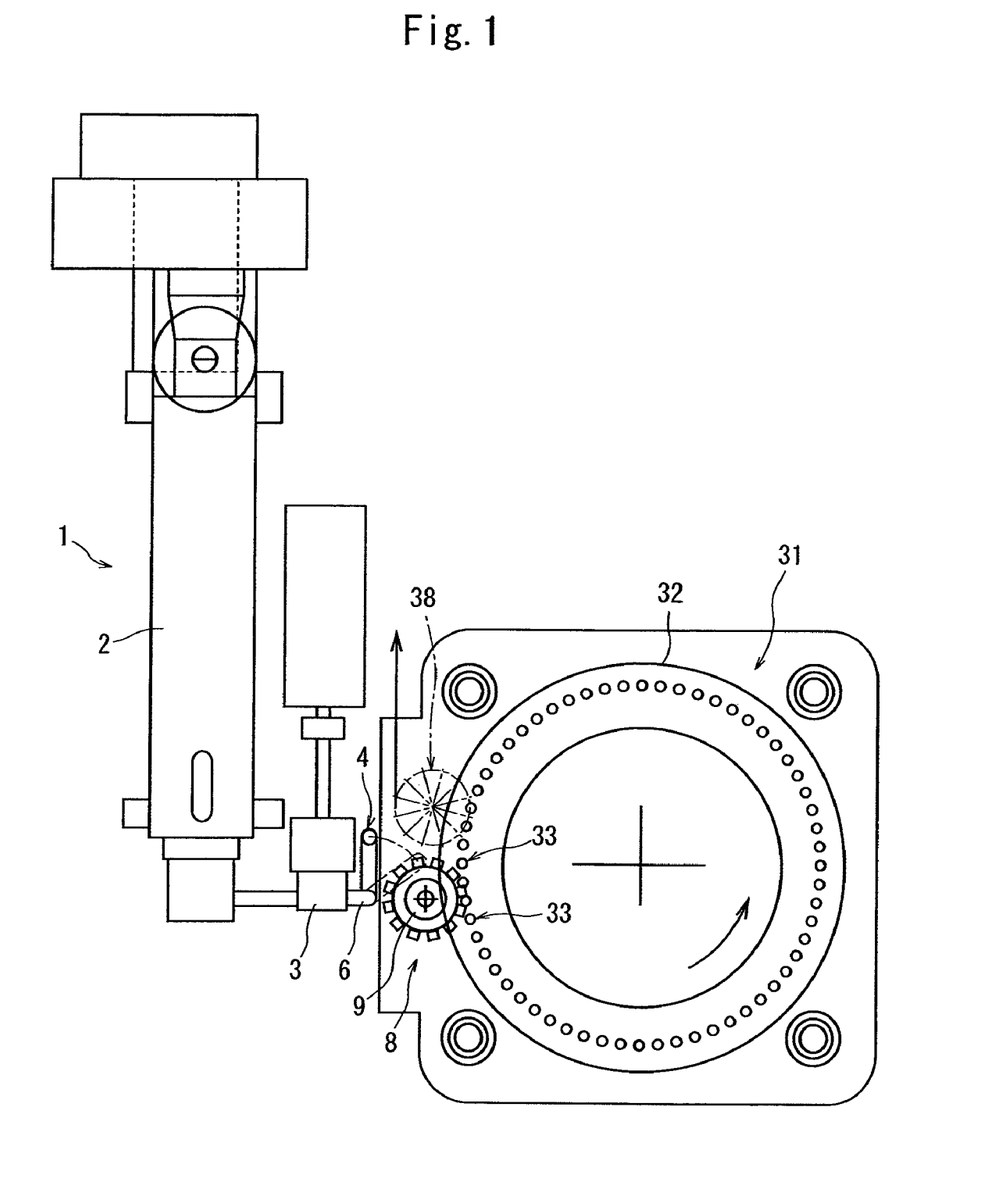
FIG. 1 is a plan view schematically illustrating an apparatus for supplying synthetic resins and a compression-forming machine according to an embodiment of the invention.

FIG. 1 illustrates an apparatus for supplying synthetic resins and a compression-forming machine according to the present invention.

Figure 2:
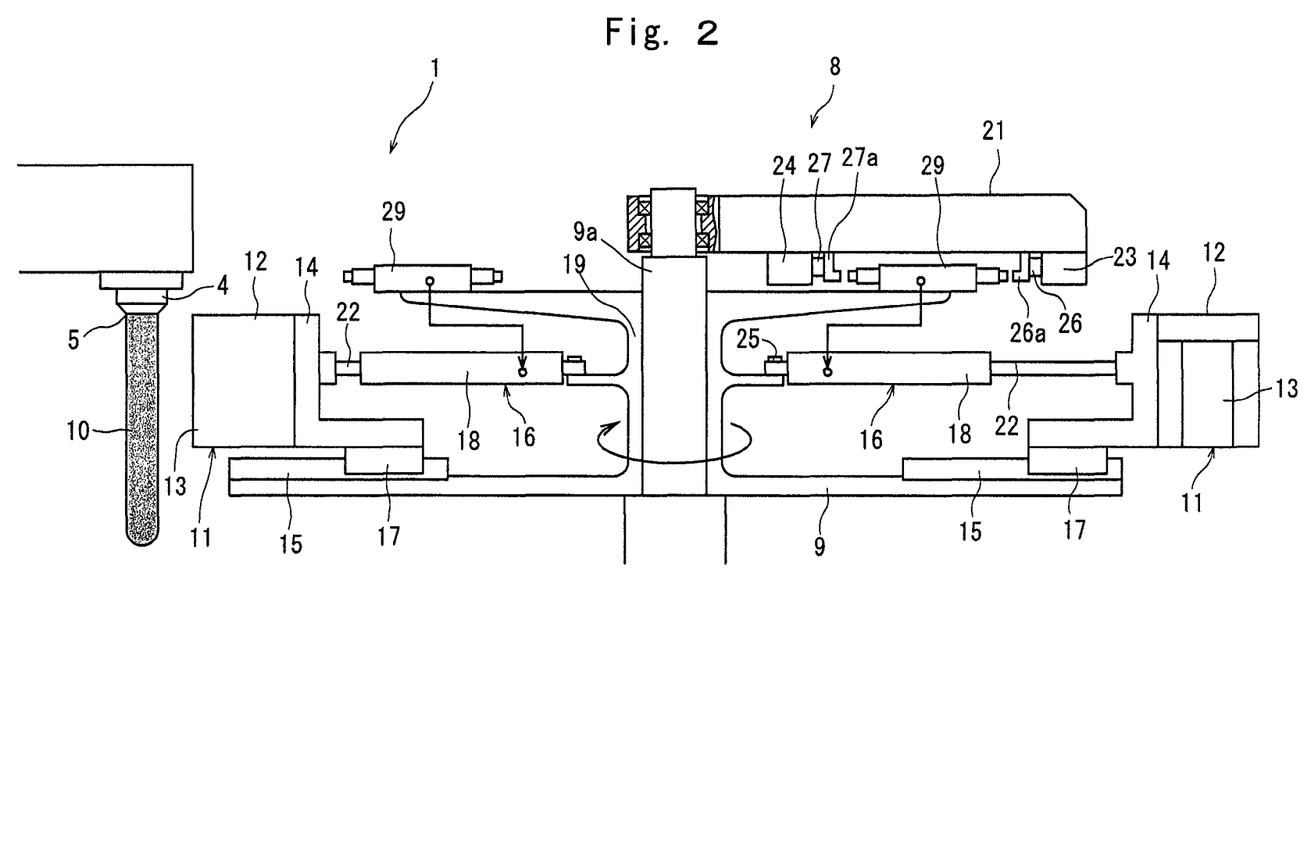
FIG. 2 is a sectional view illustrating, on an enlarged scale, the apparatus for supplying synthetic resins of FIG. 1 that is cut in the longitudinal direction.

An apparatus 1 for supplying synthetic resins is provided with a cylindrical extruder 2 and a cutter wheel 8. The extruder 2 heats, melts and kneads a synthetic resin material such as polyethylene terephthalate, and conveys the molten resin onto a gear pump 3. In order to supply the molten resin maintaining stability, the gear pump 3 is so constituted as to blow out the molten resin depending upon the mesh of gears. The gear pump 3 is connected to a downward directed extrusion nozzle 4 via a pipe 6, and the extrusion nozzle 4 is forming an extrusion opening 5 at the lower end thereof (FIG. 2). The extrusion opening 5 has a circular shape in cross section, and the synthetic resin in a molten state is formed in nearly a cylindrical shape through the extrusion opening 5 and is continuously extruded downward.

Referring to FIG. 2, the cutter wheel 8 of the apparatus 1 for supplying synthetic resins has a turntable 9. A rotary shaft 9a of the turntable 9 has an axis of rotation directed in the up-and-down direction, and is driven by a drive source (not shown) to rotate clockwise as viewed from the upper side of the apparatus (clockwise as viewed from the front surface).

The cutter wheel 8 has cutter units 11 at positions nearly facing the extrusion opening 5 in a horizontal direction, each cutter unit 11 having a cutter 12 for cutting the molten resin 10 and a holding fitting 13 for holding the molten resin 10 that is cut. The cutter units 11 are arranged in a plural number in the circumferential direction of the turntable 9 maintaining an equal angular distance.

Each cutter unit 11 includes a mounting member 14 as a support member, a guide rail 15 and an air cylinder 16. The mounting member 14 has the cutter unit 11 attached to the outer side in the radial direction of the turntable 9, and a rail receiver 17 attached to the lower side thereof. The guide rails 15 are radially arranged maintaining a gap relative to the rotary shaft 9a, and the rail receivers 17 are fitted to the guide rails 15. The rail receiver 17 slides along the guide rail 15 enabling the cutter unit 11 to advance and retreat in the radial direction.

The air cylinder 16 has its rod 22 on the front end side fixed to the back surface of the mounting member 14 and is fixed on the side of the cylinder body 18 to a support pole 19 by a bolt 25, the support pole 19 being integrally fixed to the rotary shaft 9a. The air cylinder 16 is operated by the air pressure to advance or retreat the cutter unit 11 in the radial direction. That is, at the advanced position as represented by the rod 22 of the air cylinder 16 shown on the right side in FIG. 2 (when the rod 22 is expanded), the cutter unit 11 reaches the position of cutting the molten resin 10 from the extrusion nozzle 4. When the rod 22 on the left side of FIG. 2 is at the retreated position (when the rod 22 is contracted), the cutter unit 11 is retreated inward of the turntable 9 in the radial direction from the position of the extrusion opening 5 up to a position where it does not come in contact with the molten resin 10.

Next, described below is a mechanism for advancing and retreating the air cylinders 16.

A fixed bracket 21 is extending in the radial direction at an upper end of the rotary shaft 9a. A pair of change-over cylinders 23 and 24 are arranged on the lower surface of the fixed bracket 21 on the same radii maintaining a distance so as to be opposed to each other. The change-over cylinders 23 and 24 have rods 26 and 27 in a direction in which they face each other, and cams 26a and 27a are attached to the ends of the rods 26 and 27. A mechanical valve 29 is arranged on the support plate 19 that rotates together with the rotary shaft 9a being positioned just over each cutter unit 11 so as to be positioned between the cams 26a and 27a of the change-over cylinders 23 and 24.

Figure 3:
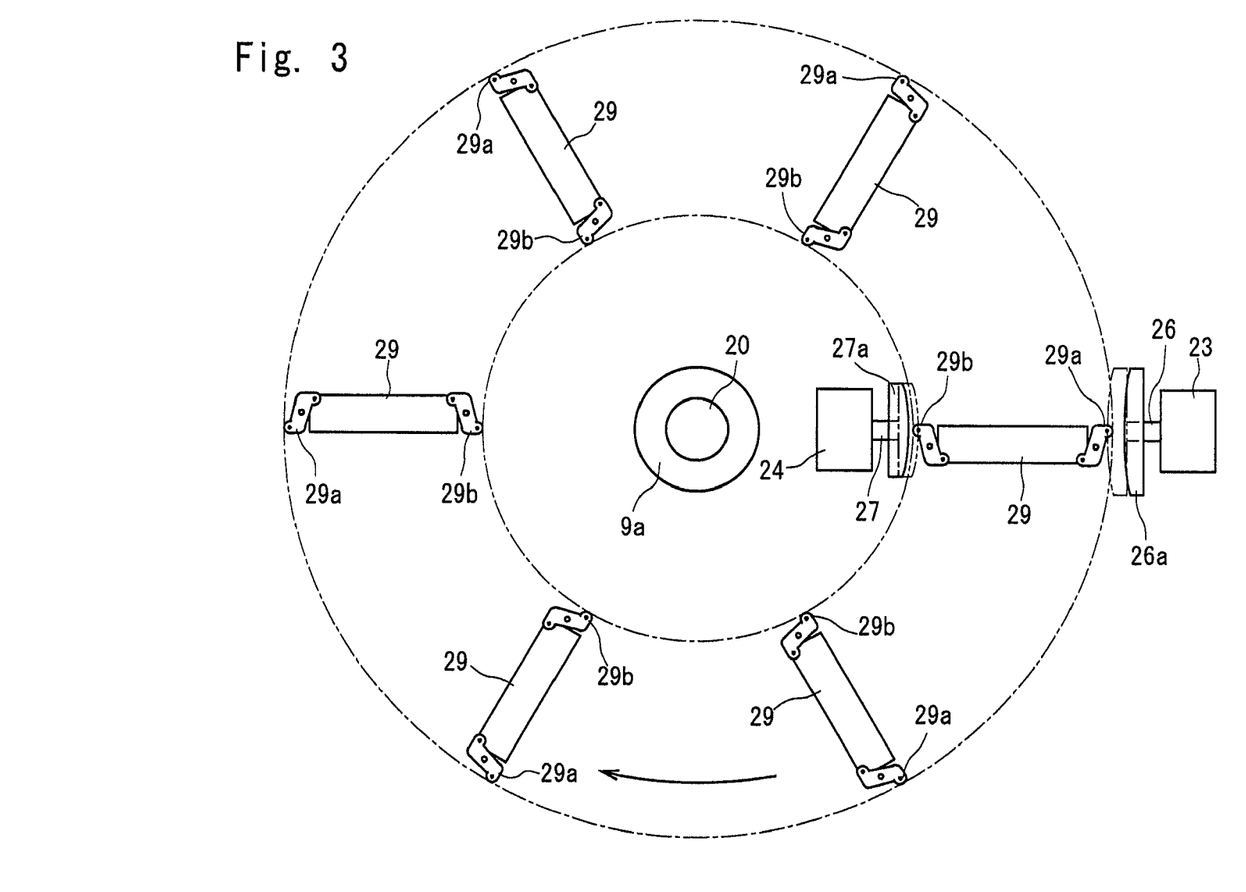
FIG. 3 is a plan view illustrating, on an enlarged scale, the apparatus for supplying synthetic resins of FIG. 1.

Referring to FIG. 3, the mechanical valve 29 has rollers 29a and 29b attached to both ends thereof in the radial direction, and is so constituted as to change over the air pressure circuit of the expansion air cylinder 16 of the cutter unit 11 when the roller 29a or 29b is pushed. The mechanical valve 29 is such that when the change-over cylinders 23 and 24 are retreated and the cutter unit 11 is revolving, the rollers 29a and 29b are allowed to slide through without coming in contact with the cams 26a, 27a or without having their surfaces pushed by them. When the change-over cylinder 23 or 24 operates, the rod 26 or 27 expands causing the cam 26a or the cam 27a to advance. Therefore, the roller 29a or 29b is pushed inward when it passes through between the cam 26a and 27a to change over the air pressure circuit. The mechanical valves 29 are provided being corresponded to the air cylinders 16, and the compressed air is supplied to the air cylinders 16 or is drained therefrom independently due to the corresponding mechanical valves 29.

As for the change-over operation of the mechanical valve 29, when the rod 22 of the air cylinder 16 is in the expanded state, each push of the roller 29a or 29b changes the air pressure circuit over causing the rod 22 to retreat. Another push of the roller 29a or 29b changes the air pressure circuit over causing the rod 22 to advance. The mechanical valve 29 is so constituted as to maintain the changed-over state despite the roller 29a or 29b is once pushed and has returned to the initial sliding state having passed through between the cams 26a and 27a unless the roller 29a or 29b is pushed again in the next time. As another example of operation, the change-over cylinder 23 or 24 is controlled to bring a given air cylinder 16 to the advanced position out of a plurality of air cylinders 16 while leaving the rest of the air cylinders 16 at the retreated positions to thereby create a state of use where the cutter units 11 are grouped into those in the operating state and those in the non-operating state.

Means for advancing or retreating the cutter unit 11 can be realized by any other means using hydraulic cylinders, ball screws and ball nut mechanisms. When the rollers 29a and 29b of the mechanical valves 29 are in phase with the cams 26a and 27a, the change-over cylinders 23 and 24 may not be positioned on the same radii on the lower surface of the fixed bracket 21.

The compression-forming machine 31 includes a rotary support member 32 and a plurality of female molds 33 arranged on the rotary support member 32. In the case of FIG. 1, the rotary support member 32 rotates counterclockwise which is opposite to the direction of rotation of the turntable 9. The molds are arranged in a plural number in the circumferential direction of the rotary support member 32 maintaining an equal distance. Each mold includes a female mold 33 which is opened in the upper portion thereof and a male mold that is not shown. The male mold is arranged just over the female mold 33 maintaining a distance at a position in a predetermined range.

In a state where the air cylinder 16 supporting the cutter unit 11 is expanded, the rotary orbit of the holding fitting 13 comes in contact with the rotary orbit of the female mold 33 in the same direction, and their circumferential speeds come into agreement with each other. Further, the rotations are in agreement so that the holding fitting 13 is located just over the female mold 33 at a position or in a section of the rotary orbits.

A take-out mechanism 38 is disposed on the downstream of the compression-forming machine 31 in the direction of rotation to take out preforms of the containers formed by the female molds 33.

Figure 7:
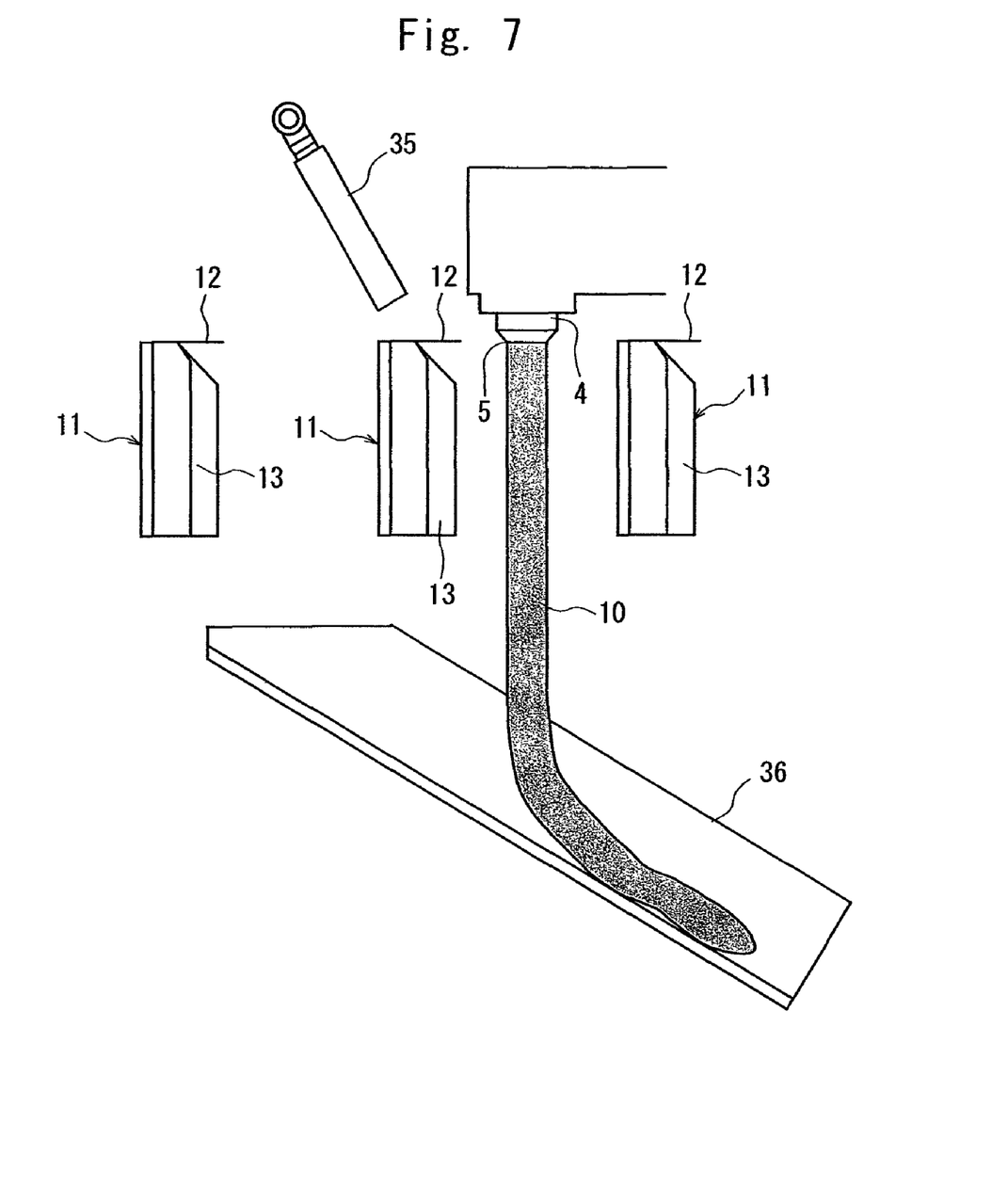
FIG. 7 is a sectional view illustrating, on an enlarged scale, a state where a molten resin is unstably discharged from an extrusion nozzle portion of the extruder of the apparatus for supplying synthetic resins of FIG. 1.

Referring to FIG. 7, a recovery tray 36 is provided near the extrusion nozzle 4 to recover the molten resin 10 discharged lacking stability. A blow nozzle 35 is similarly arranged near the extrusion nozzle 4 to blow off the molten resin 10 onto the recovery tray 36. Air compression means that is not shown is connected to the blow nozzle 35.

Next, described below is the action of the apparatus for supplying synthetic resins according to this embodiment.

Figure 4:
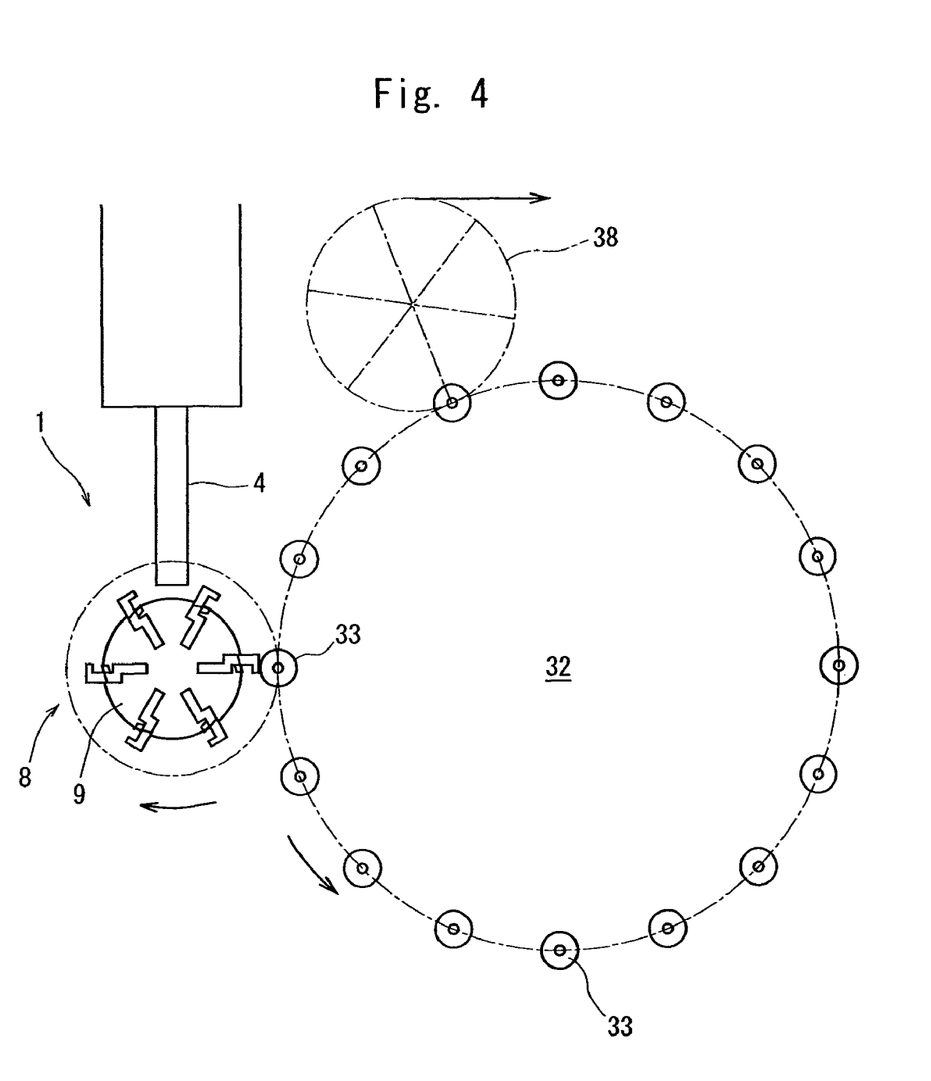
FIG. 4 is a plan view schematically illustrating a non-operating state where the cutter wheel of the apparatus for supplying synthetic resins of FIG. 1 is all retreated in the radial direction.

To supply the molten resin in the forming operation, first, the extrusion nozzle 4 of the extruder 2 is brought to a position of operation. The cutter units 11 of the cutter wheel 8 are rotated in a state where the rods 22 of the air cylinders 16 are contracted. It is desired that the rotational speed is in agreement with that of the rotary support member 32 of the compression-forming machine 31. Due to the operation of the gear pump 3, the molten resin 10 is continuously extruded from the extrusion opening 5. At the start of operation of the extruder 2, however, the amount of the molten resin 10 discharged from the extrusion opening 5 lacks stability. In this state as shown in FIG. 4, the cutter units 11 are brought to the retreated positions, so that the radius of rotation of the cutter units 11 does not reach the position of the molten resin.

Therefore, the cutters 12 do not come in contact with the molten resin 10 and do not cut the molten resin 10.

Figure 5:
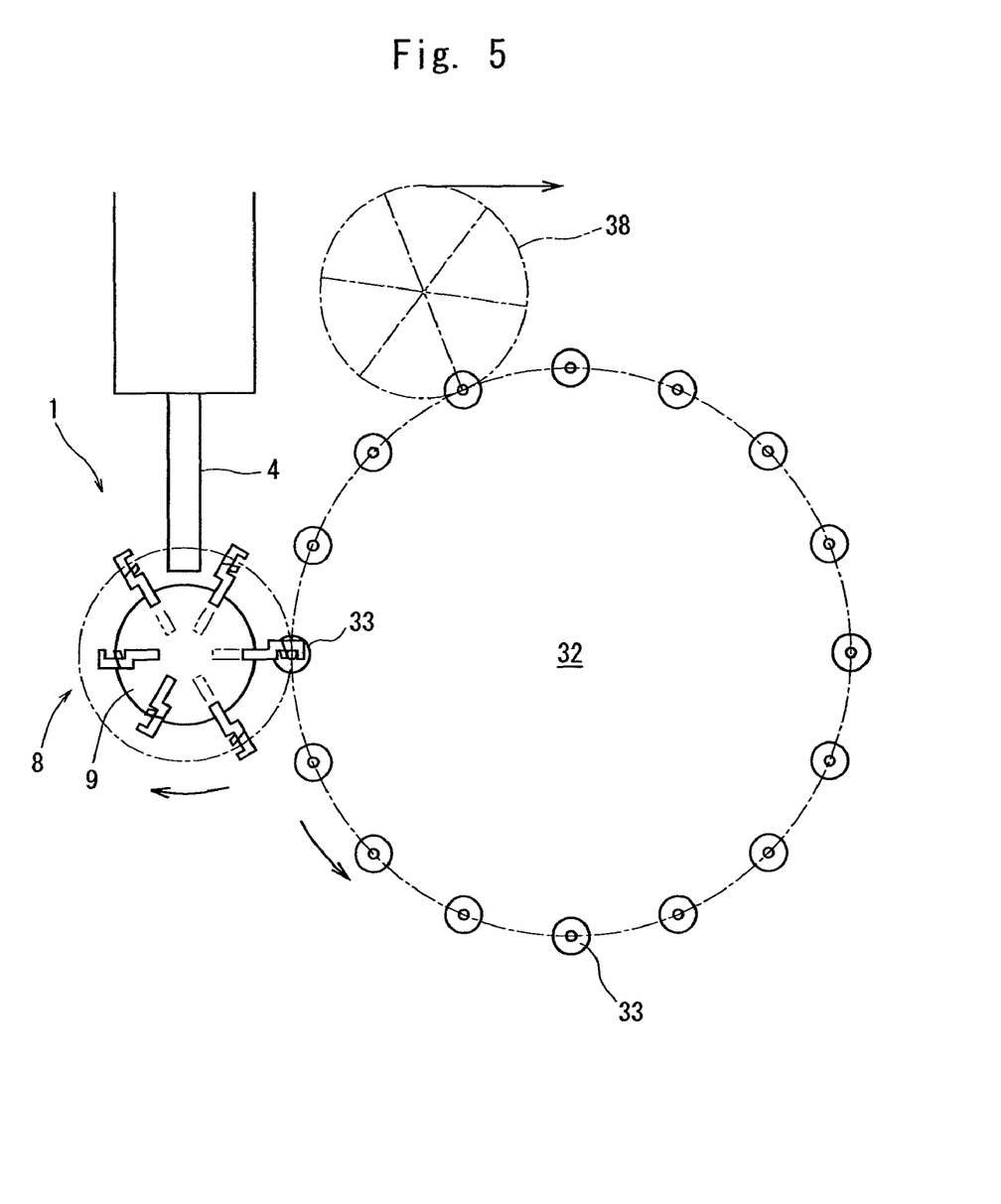
FIG. 5 is a plan view schematically illustrating a state where the cutter wheel that had been in the halted state of the apparatus for supplying synthetic resins of FIG. 1 is brought to a state of starting the operation.
Figure 6:
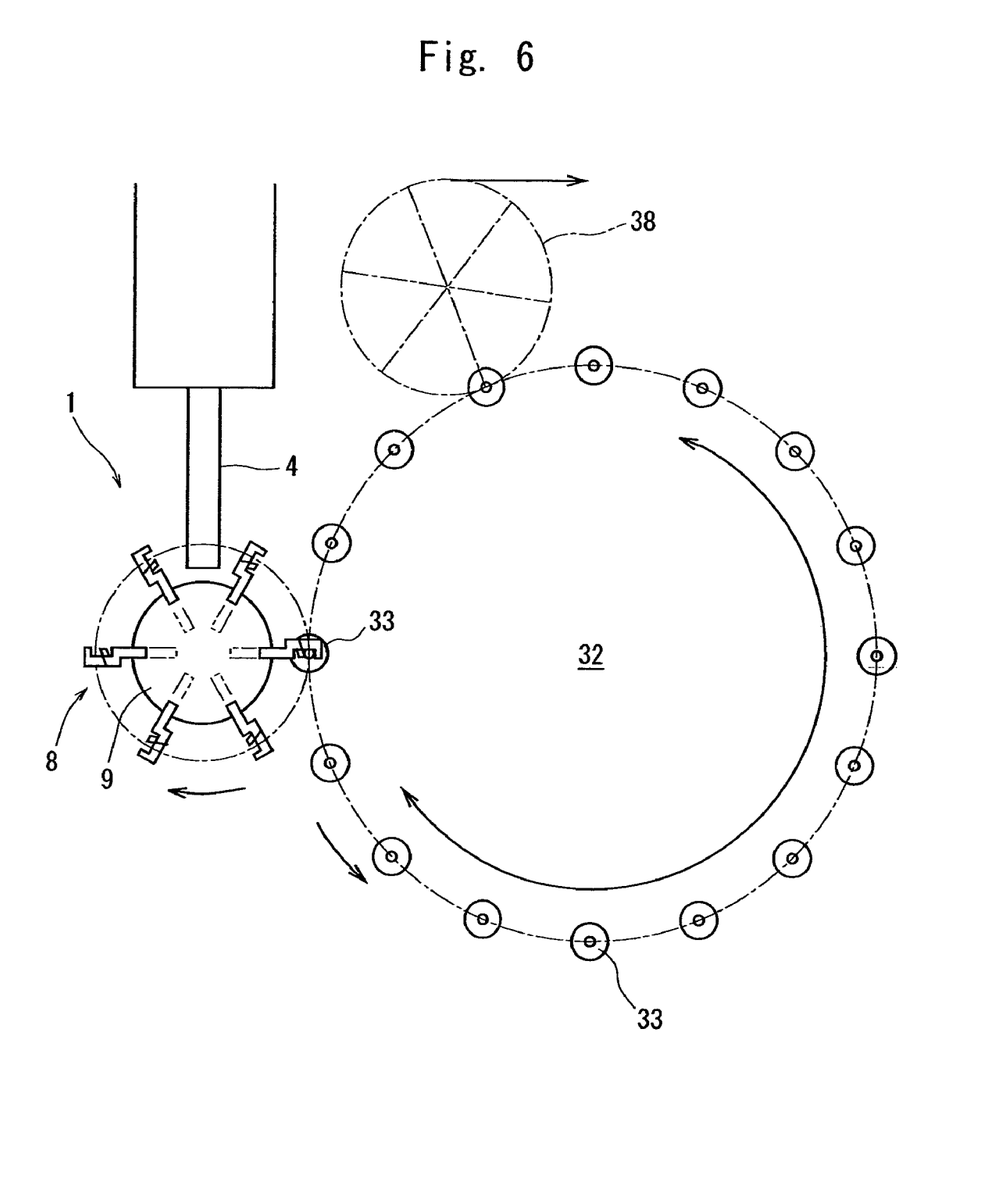
FIG. 6 is a plan view schematically illustrating a state of operation where the cutter wheel of the apparatus for supplying synthetic resins of FIG. 1 is all advanced in the radial direction.

After the amount of the molten resin 10 discharged from the extrusion opening 5 is stabilized, the change-over cylinders 23 are expanded from the retreated state due to mechanical or electric air pressure change-over instruction to advance the cams 26a. This causes the roller 29a of the mechanical valve 29 to be pushed inward in the axial direction, whereby the mechanical valve 29 changes over the circuit of the compressed air that is not shown so that the compressed air is supplied to the air cylinder 16 for changing a rotational radius of the cutter unit 11. The plurality of mechanical valves 29 successively pass over the cam 26a as shown in FIG. 5 to change over the circuit of the compressed air. After the circuits of all mechanical valves 29 (six mechanical valves in the drawing) corresponding to the cutter units 11 have been changed over, the rods 22 of all air cylinders 16 are brought to the advanced positions as shown in FIG. 6. In the change-over cylinders 23, on the other hand, the rods 26 are retreated, and the cam 26a is not in contact with the roller 29a or is in a sliding state without pushing the roller 29a; i.e., the mechanical valve 29 does not change over the compressed air circuit connected to the air cylinder 16, and the present state is maintained.

As described above, the cutter units 11 are rotating even when the molten resin 10 are unstably supplied, enabling the turntable 9 to rotate in agreement with the rotation of the rotary support member 32 at all times. That is, if the rotational speeds of the cutter units 11 and of the turntable 9 are maintained at the speeds of molding, a predetermined operation can be accomplished by simply expanding the cutter units 11, and the molten resin 10 can be supplied into the female molds 33. This method is advantageous particularly when the rotary support member 32 is rotating at a high speed. The rotation of the turntable 9 does not need to be adjusted to be in agreement with the circumferential speed of the rotary support member 32. Even when rotating at a speed lower than that of the rotary support member 32, the speed of the turntable 9 can be readily changed into the circumferential speed of the rotary support member 32 or to the circumferential speed at the time of forming as compared to when the turntable 9 remains stationary. This is the effect accomplished by maintaining the turntable 9 rotating.

When the cutter units 11 are advanced from the retreated positions due to the expansion of rods 22 of the air cylinders 16 as a result of changing over the mechanical valves 29, the rotary orbit of the cutters 12 comes in agreement with the position of the extrusion nozzle 4, and the cutters 12 pass just under the extrusion opening 5.

Figure 8:
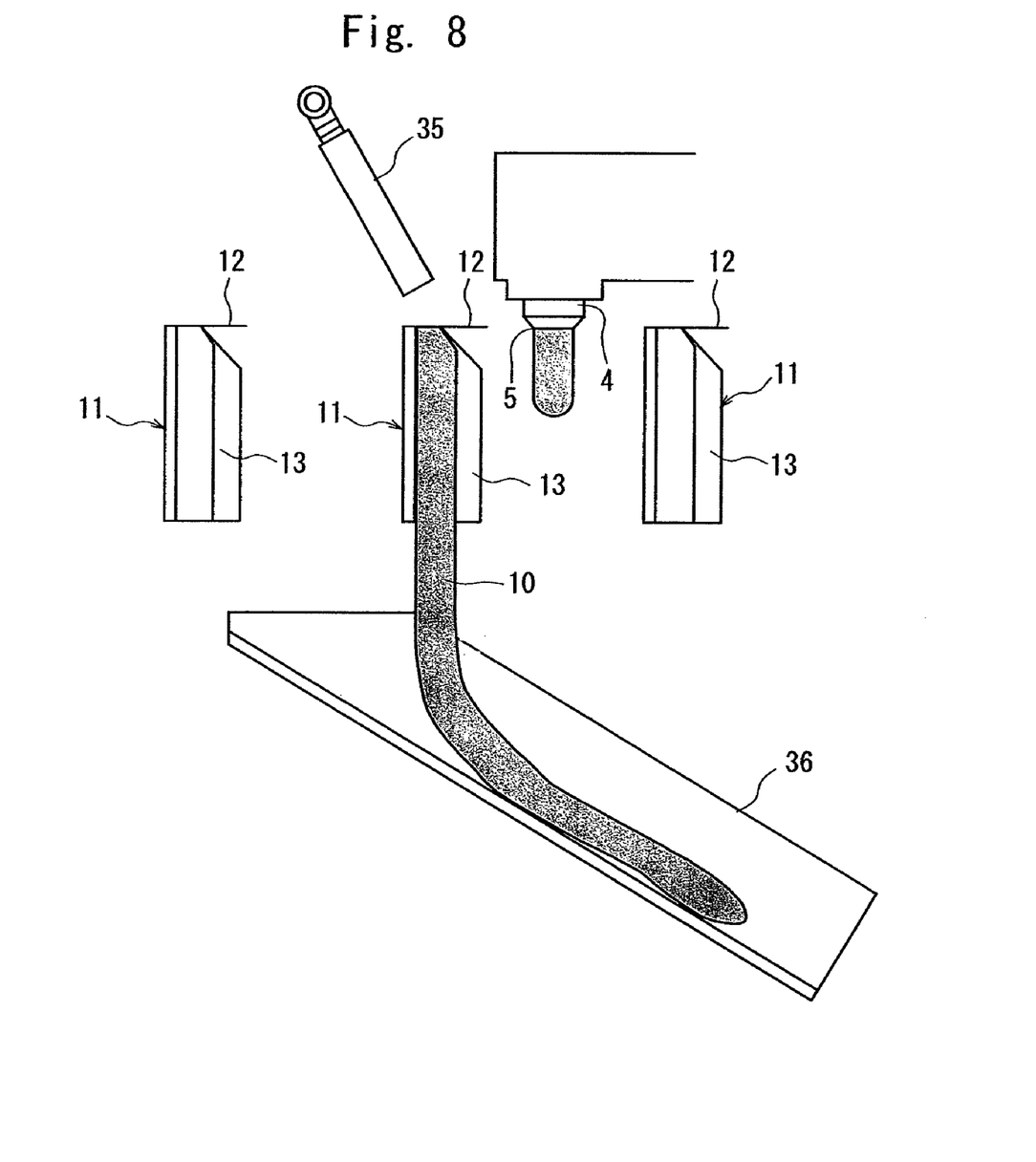
FIG. 8 is a sectional view illustrating, on an enlarged scale, a state where the unstable resin of FIG. 7 is cut.

At the start of blow out, the molten resin 10 is discharged from the extrusion nozzle 4 lacking stability and the amount of blow out is not steady or when the molten resin in the state of production is going to be no longer supplied, the resin is drained from the blowout port lacking stability as shown in FIG. 7. It is not, therefore, desired to use the molten resin 10 just after the start of blowout or immediately after having returned from the halted state. As shown in FIG. 8, therefore, a blow nozzle 35 is provided near the extrusion nozzle 4 to inject a gas such as the air and, besides, a recovery tray 36 is provided under the blow nozzle 35 in the direction of injection. The initial molten resin is cut by the cutter 12 and is blown off by the action of the blow nozzle 35 to fall on the recovery tray 36 so as to be recovered as shown in FIG. 9 without being supplied to the compression-forming machine 31.

Figure 9:
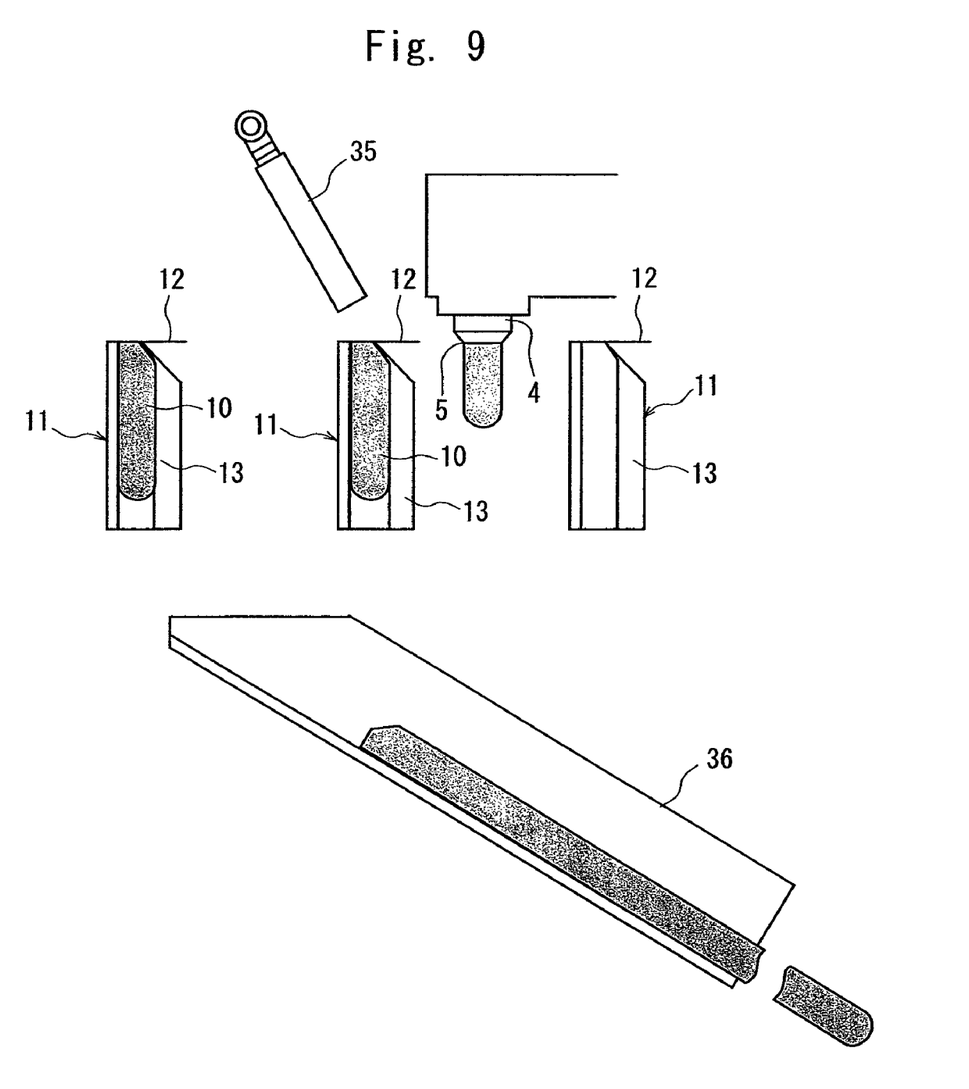
FIG. 9 is a sectional view illustrating, on an enlarged scale, a state where the unstable resin of FIG. 8 is falling on the recovery tray, and the cutter units are in the state of operation.

Next, the molten resin 10 stably supplied from the extrusion nozzle 4 is successively cut by the cutters 12 and are held by the holding fittings 13 as shown in FIG. 9.

The turntable 9 of the cutter wheel 8 and the rotary support member 32 of the compression-forming machine 31 are rotated in synchronism with each other by their respective drive sources. The turntable 9 and the rotary support member 32 rotate in the opposite directions relative to each other. At a contact point between the two rotary orbits (in practice, these orbits are existing at upper and lower positions without contacting in the transverse direction but are overlapped as viewed on a plane), therefore, the directions of rotation are the same. Upon rotating the turntable 9 and the rotary support member 32, therefore, the holding fitting 13 and the female mold 33 are brought into synchronism with each other and become stationary relative to each other at the contact point of the rotary orbits. When brought to a position just over the female mold 33, the molten resin 10 falls down being released from the state of held by the holding fitting 13, and is supplied into the female mold 33. As the cutters 12 successively pass just under the extrusion opening 5, the molten resin 10 is cut, held, and is supplied into the female molds 33.

The state where the molten resin 10 is held by the holding fitting 13 can be discontinued by releasing the molten resin 10 from the holding fitting in a manner as described above, as well as by discontinuing the holding of the molten resin 10 by the holding fitting 13 by friction in a manner of imparting acceleration to the molten resin 10 (forcibly imparting acceleration in the up-and-down direction, or imparting acceleration that is produced when the circular orbit of the holding fitting undergoing a uniform circular motion is changed) or by imparting vibration to the holding fitting 13 as disclosed in WO 2005/007378.

In the compression-forming machine 31, when the female mold 33 that has received the molten resin 10 arrives at a predetermined position accompanying the rotation of the rotary support member 32, the male mold (not shown) disposed just over the female mold 33 starts descending to commence the compression-forming, and the compression-forming is finished at a predetermined position on the downstream. A preform of a container that is not shown is obtained through the above-mentioned operation. Accompanying the rotation of the rotary support member 32, the male mold continues to ascend and returns back to the predetermined position before the female mold 33 arrives at the take-out mechanism 38. In the take-out mechanism 38, the preform is taken out from the female mold 33 and is delivered to the next step. The above-mentioned operation is repeated.

Figure 10:
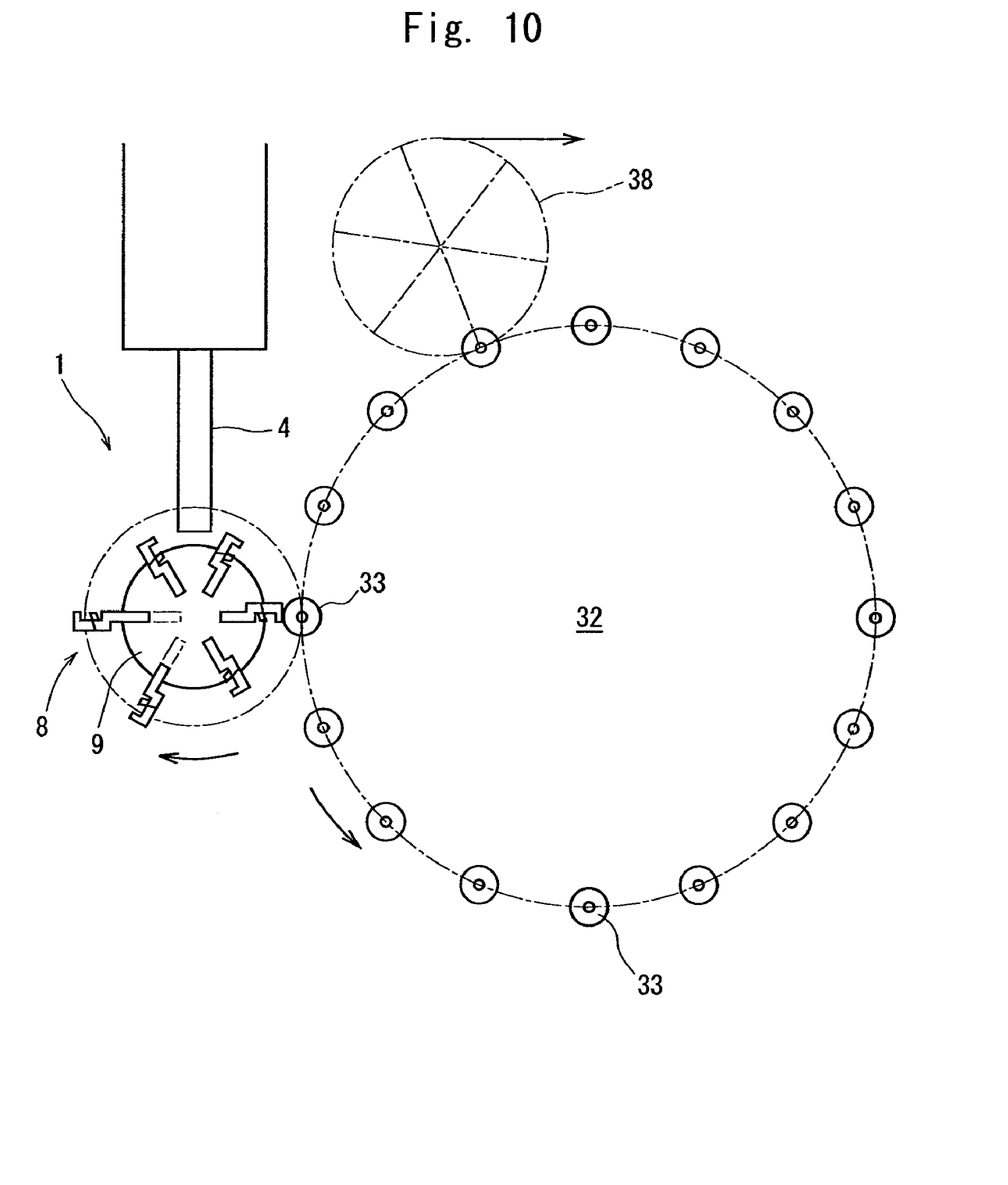
FIG. 10 is a plan view schematically illustrating a state where the cutter wheel that had been in the state of operation in the apparatus for supplying synthetic resins of FIG. 1 is brought into the halted state.

When the operation of the compression-forming machine 31 is to be interrupted for a short period of time, the change-over cylinder 24 at the retreated position is expanded to advance the cam 27a. The roller 29b of the mechanical valve 29 is pushed inward in the axial direction. Referring to FIG. 10, the circuit of the compressed air to the air cylinders 16 is changed over as the mechanical valves 29 successively pass over the cam 27a. After the circuits of all mechanical valves 29 (six mechanical valves 29 in the drawing) corresponding to the cutter units 11 are changed over, the rods 22 of all air cylinders 16 are brought to the retreated positions as shown in FIG. 4. In the above description, the change-over cylinder 23, rod 26, cam 26a and roller 29a are used for moving the rods 22 of the cylinders 16 to the advanced positions while the change-over cylinder 24, rod 27, cam 27a and roller 29b are used for moving the rods 22 of the cylinders 16 to the retreated positions. However, the opposite roles may be played by these components. The roller 29a or the roller 29b may be provided on one side, and the advance or retreat may be changed over every time when the roller 29a or 29b is pushed one time even on one side.

During the ordinary operation for continuous molding, the preforms of the containers are formed by continuously introducing the molten resin into the female molds 33 of the compression-forming machine 31. When the number of production of the containers is to be adjusted due to the reasons of production, however, the preforms do not have to be continuously formed. For example, the mechanical valves 29 may be controlled by the change-over cylinders 23 and 24 to advance every other cutter unit 11 to be placed in the operating state, and the remaining cutter units 11 maybe retreated to be placed in the non-operating state. In this case, the molten resin 10 is introduced into every other female mold 33 of the compression-forming machine to form the preforms of the containers.

Though an embodiment of the invention was described above in detail with reference to the accompanying drawings, it should be noted that the invention is in no way limited to the above embodiment only but can be varied or modified in a variety of other ways without departing from the scope of the invention.

In the above embodiment, for example, the turntable 9 has a plurality of cutter units 11 arranged in the circumferential direction maintaining an equal distance, and the rotary support member 32 of the compression-forming machine 31 has a plurality of molds inclusive of the female molds 33 arranged in the circumferential direction maintaining an equal distance. The number of the cutter units 11 may not be a plural number but, instead, only one cutter unit 11 maybe arranged on the turntable 9 and only one female mold 33 may be arranged on the rotary support member 32.

In the above embodiment, further, the mechanical valves 29 are arranged in a number corresponding to the air cylinders 16. However, two or more air cylinders 16 may be controlled by using one mechanical valve 29.

The rods 26 of the air cylinders 16 can be advanced and retreated not by the control operation of this embodiment only but by any other mechanical control operation or electrical control operation. Instead of the mechanical valves 29, change-over cylinders 23, 24 and cams 26a, 27a, there may be provided a sensor or the like to electrically detect a moment when a given cutter unit has arrived at a predetermined rotational angle (e.g., angle at which the change-over cylinder of FIG. 3 is disposed: direction of 3 o'clock of a watch). When an instruction of advance or retreat is to be sent to the cutter unit 11, the air pressure circuit may be changed over at a moment when a predetermined rotational angle is reached to operate the air cylinder 16 and to expand or contract the rod 22. Further, the expansion cutter unit 11 may be advanced or retreated by using an electric motor or the like in place of the air cylinder 16.

As for retreating the cutter units, the air cylinders 16 may be retreated by obtaining a retreat signal, through a switch or the like, from a circuit separate from the mechanical valves 29, so that the cutter units can all be reset to the retreated positions in case the forming machine is to be brought into an emergency halt.

In this embodiment, further, the cutter units 11 are advanced and retreated in the radial direction of rotation thereof. As taught in WO 2005/007378, however, the molten resin maybe selectively cut or may not be cut by expanding or contracting the radius of rotation by advancing or retreating the cutter units even when the direction in which the cutter units advance or retreat is tilted with respect to the radius of rotation or even when the direction in which the cutter units advance or retreat varies with respect to the direction of radius of rotation due to the swinging motion.

Described below are the effects of the present invention.

In the apparatus for supplying synthetic resins of the present invention, the cutter units are allowed to expand in the radial direction of rotation, are allowed to advance outward in the radial direction of rotation to cut the molten resin when the molten resin is stably discharged from the extruder, and are retreated to the positions on the inner side in the direction of radius of rotation where they do not come in contact with the molten resin when the molten resin is blowing out from the extruder lacking stability, while permitting the cutter wheel to continuously rotate. Despite the cutter wheel continues to rotate while the molten resin is being discharged lacking stability, the cutter units do not come in contact with the molten resin. When the operation is to be resumed from a state where the forming has been interrupted, the cutter units remain retreated while the cutter wheel maintains the rotational speed same as that of during the operation and, therefore, the operation for cutting the molten resin can be quickly resumed by simply advancing the cutter units.

At the time of returning the cutter wheel back to the operation from the state where it had been at rest, the cutter units are maintained retreated, the rotational speed of the cutter wheel gradually increases up to the forming speed in a state of not cutting the resin and, thereafter, the cutter units are advanced to resume the forming operation. It is, therefore, allowed to use a motor and a clutch having small driving forces.

In the apparatus for supplying synthetic resins, the cutter wheel is provided with a plurality of the cutters and holding means corresponding to the cutters, some support members are expanded among those of the plurality of cutters, the molten resin is cut by the cutter of every other support member or every plural support members that are expanded, and the molten resin is supplied by the holding means to the molds. Therefore, the molten resin can be supplied to every other mold or every plural molds among the plurality of molds of the metal mold wheel and can be, thus, supplied to the molds depending upon the amount of supplying the molten resin from the extruder.

In the apparatus for supplying synthetic resins, the cutter units are attached to the expansion cylinders and are advanced and retreated by the expansion cylinders relying upon a simple structure making it possible to advance and retreat the cutters and the holding members.

In the apparatus for supplying synthetic resins, the blow nozzle is provided near the extrusion nozzle to inject a gas, a tray for recovering the molten resin is provided in a direction in which the gas is blown out from the blow nozzle, and the unused molten resin cut by the cutters is recovered by the tray. Therefore, the unstably supplied molten resin can be recovered at any place due to the gas blown from the blow nozzle.

The invention claimed is:

1. An apparatus for supplying synthetic resins including a cutter wheel which rotates cutter units each having:
   a cutter for cutting a molten resin extruded from an extrusion opening of an extrusion nozzle of an extruder; and
   holding means for holding the molten resin cut by said cutter at a position close to said cutter,
   wherein said cutter wheel and a metal mold wheel are rotated in a manner that said holding means is positioned over a molten resin-receiving port of a mold at a portion where a rotary orbit of molds of a metal mold wheel for forming the molten resin is overlapped on a rotary orbit of said cutter units maintaining a gap in the up-and-down direction, and the molten resin held by said holding means is released at said overlapped portion so as to be supplied into the mold,
   said apparatus further comprising means for advancing and retreating said cutter units in a radial direction, and a change-over mechanism for controlling said means for advancing and retreating said cutter units to an expanded or contracted state,
   wherein the cutter units are moved by action of said change-over mechanism to an advanced position which is outward in the radial direction of rotation thereof when the molten resin is stably blown out from said extruder, the molten resin being cut by the cutters while said cutter units pass below the extrusion opening of the extrusion nozzle, and, when the molten resin is unstably blown out from said extruder, said cutter wheel continues to rotate while said cutter units retreat to retreated positions on an inner side in the radial direction of rotation thereof by action of said change-over mechanism so as not to come in contact with the molten resin.

2. An apparatus for supplying synthetic resins according to claim 1, wherein said cutter wheel is provided with the cutter units in a plural number, at least one cutter unit among the plurality of cutter units is arranged at a retreated position, and the molten resin is cut by the cutters of the remaining cutter units at the advanced positions.

3. An apparatus for supplying synthetic resins according to claim 1, wherein a blow nozzle for ejecting a gas is provided near said extrusion nozzle, a tray for recovering the molten resin is provided in a direction in which the gas is injected from said blow nozzle, and the unused molten resin cut by said cutters is recovered by said recovery tray.

4. An apparatus for supplying synthetic resins according to claim 1, wherein said means for advancing and retreating comprises an electric motor.

5. An apparatus for supplying synthetic resins according to claim 1, wherein said means for advancing and retreating comprises extendable expansion cylinders.

6. An apparatus for supplying synthetic resins according to claim 1, wherein the change-over mechanism is disposed on a lower surface of a fixed bracket extending in the radial direction at an upper end of a rotary shaft of the cutter wheel, and wherein the means for advancing and retreating includes extendable expansion cylinders that expand and retract,
   said change-over mechanism comprising:
   a mechanical valve for advancing or retreating the cutter units by changing over an air pressure circuit of the expansion cylinders;
   rollers attached to both ends of the mechanical valve;
   change-over cylinders arranged on the fixed bracket of the cutter wheel; and
   cams attached to the ends of the change-over cylinders which come into contact with the rollers when the change-over cylinders are expanded and do not come in contact with the rollers when the change-over cylinders are retracted,
   wherein, when the cams contact with the rollers, the air pressure circuit of the expansion cylinders are changed over to advance or retreat the cutter unit.

7. An apparatus for supplying synthetic resins, comprising:
   a cylindrical extruder having an extrusion nozzle with an extrusion opening for extruding a molten resin;
   a cutter wheel which rotates cutter units, wherein each cutter unit has a cutter for cutting the extruded molten resin as the cutter unit passes immediately below the extrusion opening; and holding means for holding the molten resin cut by said cutter at a position close to said cutter, wherein said holding means is provided on said cutter wheel;

a metal mold wheel for forming the molten resin, wherein said cutter wheel and said metal mold wheel are rotated in a manner that said holding means is positioned over a molten-receiving port of a mold to a portion where a rotary orbit of molds of said metal mold wheel is overlapped on a rotary orbit of said cutter units while maintaining a gap therebetween in the vertical direction, and the molten resin held by said holding means is released at said overlapped portion so as to be supplied into the mold; and a change-over mechanism disposed on a lower surface of a fixed bracket of said cutter wheel, for selectively changing a position of each of the cutter units, while said cutter wheel is rotating, between (1) an advanced position in which the cutter unit is moved outward in a radial direction of said cutter wheel so that the cutter unit passes below the extrusion opening, and (2) a retreated position in which the cutter unit is moved inward in the radial direction of said cutter wheel so that the cutter unit does not pass below the extrusion opening, wherein said change-over mechanism is capable of selectively and separately changing each of the positions of the respective cutter units to either (1) an advanced position when the molten resin is stably blown out from said extruder or (2) to a retreated position when the molten resin is unstably blown out from said extruder, as the cutter units respectively pass by the change-over mechanism during the rotating of the cutter units.

* * * * *